United States Patent [19]

Cohen et al.

[11] 4,373,047

[45] Feb. 8, 1983

[54] FLAME RETARDANT THERMOPLASTIC COMPOSITIONS WITH REDUCED BLOOM

[75] Inventors: Stuart C. Cohen; Ronald L. Dieck, both of Evansville, Ind.

[73] Assignee: General Electric Company, Pittsfield, Mass.

[21] Appl. No.: 210,866

[22] Filed: Nov. 26, 1980

Related U.S. Application Data

[63] Continuation of Ser. No. 11,680, Feb. 12, 1979, abandoned.

[51] Int. Cl.³ .............................................. C08L 23/06
[52] U.S. Cl. .................................... 524/371; 524/406; 524/412; 524/437; 524/449; 524/451; 524/508; 524/513; 524/523; 524/526; 525/173; 525/174; 525/176; 525/177
[58] Field of Search ...... 525/177; 260/40 R, 45.95 G; 524/371, 406, 412, 437, 449, 451, 508, 513, 523, 526

[56] References Cited

U.S. PATENT DOCUMENTS

| | | | |
|---|---|---|---|
| 2,465,319 | 3/1949 | Whinfield et al. | 260/75 |
| 3,047,539 | 7/1962 | Pengilly | 260/75 |
| 3,624,024 | 11/1971 | Caldwell et al. | 260/40 R |
| 3,751,396 | 8/1973 | Gall | 260/40 R |
| 3,873,491 | 3/1975 | Gall | 260/40 R |
| 3,953,394 | 4/1976 | Fox et al. | 525/177 X |
| 3,971,752 | 7/1976 | Aoyama et al. | 260/40 R |
| 4,010,219 | 3/1977 | Aoyama et al. | 260/45.7 R X |
| 4,070,332 | 1/1978 | Morikawa et al. | 260/40 R |
| 4,097,446 | 6/1978 | Abolins et al. | 525/177 X |

FOREIGN PATENT DOCUMENTS 1091256 11/1967 United Kingdom ................ 525/177

*Primary Examiner*—J. Ziegler
*Attorney, Agent, or Firm*—Hedman, Casella, Gibson & Costigan

[57] ABSTRACT

Normally flammable polyester resins (a) are rendered flame-retardant with reduced blooming or plate out tendencies and without loss in toughness or other properties in combination with (b) a flame retardant amount of decabromodiphenyl ether and (c) a flame-retardant synergist compound, by including a small amount of (d) an olefin polymer and/or an olefin copolymer. The compositions, which are useful per se for molding, extrusion, and the like, are, in addition, described in impact modified resin compositions and filled and/or reinforced modifications.

12 Claims, No Drawings

FLAME RETARDANT THERMOPLASTIC COMPOSITIONS WITH REDUCED BLOOM

This is a continuation of application Ser. No. 11,680, filed Feb. 12, 1979, abandoned.

The present invention relates to new and novel flame retardant thermoplastic compositions. More particularly it is concerned with compositions of high molecular weight polyesters in combination with flame retardant amounts of decabromodiphenyl ether, which have improved bloom reduction.

BACKGROUND OF THE INVENTION

The use of high molecular weight polyesters in thermoplastic molding compositions is well known to those skilled in the art. Such polyesters provide compositions with excellent moldability and molded articles therefrom having smooth and glossy surface appearance, high strength, stiffness, temperature resistance and other desirable properties.

However, a major short-coming in the use of such polyesters in molding compositions is their normally highly flammable nature. The flammability of polyesters has been reduced by using halogen-, phosphorus- or nitrogen-containing additives, and such compositions are described in various patents and publications. Flame retarded thermoplastic polyester compositions are desired for many fields of use such as in home construction, automobile and aircraft manufacture, packaging, electrical equipment and the like.

With particular reference to polyesters of the poly(alkylene dicarboxylate) family and related copolyesters, it has been difficult to adequately render such materials flame retardant without sacrificing their inherent superior toughness properties. Specifically, the use of conventional flame retardant additives in conventional amounts causes decreases in toughness, e.g., flex resistance and heat distortion resistance, especially in glass filled embodiments.

A highly useful family of flame retardant agents has been reported to comprise polybrominated diphenyl ether compounds, and particularly decabromodiphenyl ether. Patent describing such flame retardants are U.S. Pat. Nos. 3,624,024; 3,751,396; 3,873,491; 3,971,752; 4,010,219; and 4,070,332, the disclosures of which are incorporated herein by reference. Although diphenyl ethers having from 2 to 10 bromines are disclosed to be useful, e.g., in U.S. Pat. No. 4,010,219, the decabromodiphenyl ether analog has become the flame-retardant agent of commercial choice in poly(1,4-butylene terephthalate) resin compositions. Unfortunately, this compound has the undesirable habit of migrating to the surface of articles molded from compositions containing it. This habit, known as "blooming" or "plate-out", not only is visually unacceptable, but also causes breakdown in surface electrical characteristics of parts molded from compositions in which decabromodiphenyl ether is the flame-retardant agent.

It has now been discovered that if a small effective amount of an olefin polymer and/or olefin copolymer, e.g., polyethylene, is added to flame retardant polyester compositions wherein decabromodiphehyl ether is employed, compositions with a surprisingly reduced tendency to bloom when subjected to high temperatures over a period of time, are obtained. Furthermore, such compositions are provided without sacrificing the other desirable traits, such as toughness, of the polyester resins molding compositions of the prior art.

By way of illustration, the addition of a polyolefin resin additive to decabromodiphenyl ether/polyester blends provides compositions which are flame retardant to the point where they meet stringent Underwriter's Laboratory requirements for self-extinguishing compositions, but which at the same time hardly "bloom" or "plate out" at all on the surface of molded parts when subjected to oven aging at 100°, 140°, and 170° C. for 1 hours, 24 hours and 168 hours. In contrast, under the same conditions, oven aging decabromodiphenyl ether polyester blends without polyolefin causes formation of a powder bloom on the surface, detrimentally affecting electrical properties.

It is, accordingly, a principal object of this invention to provide a family of bloom-resistant, flame retardant polyester compositions.

It is another object of this invention to provide flame retardant polyester compositions with excellent moldability and which, after oven aging, retain smooth and glossy surfaces, high flexural strength and, especially, superior surface electrical properties.

Other objects and advantages of the invention will become apparent from the following detailed description.

DESCRIPTION OF THE INVENTION

According to the invention there are provided non-blooming improvements in flame retardant thermoplastic compositions comprising
 (a) a normally flammable high molecular weight polyester;
 (b) a flame retardant amount of decabromodiphenyl ether, and
 (c) an effective amount of an organic or inorganic flame retardant synergist compound
in which the improvement consists of including, as component (d), an effective amount of an olefin polymer, an olefin copolymer or a mixture thereof whereby a composition is obtained from which the decabromodiphenyl ether flame retardant shows a reduced tendency to bloom or plate out after molding and thermally aging the molded articles.

The term "normally flammable high molecular weight polyester" includes, in general, linear saturated condensation products of diols of dicarboxylic acids, or reactive derivatives thereof. Preferably, they will comprise condensation products of aromatic dicarboxylic acids and aliphatic diols. It is to be understood that it is also possible to use polyesters such as poly(1,4-dimethylol cyclohexane dicarboxylates, e.g, terephthalates). In addition to phthalates, small amounts of other aromatic dicarboxylic acids such as naphthalene dicarboxylic acid, or aliphatic dicarboxylic acids, such as adipic acid, can also be present in preferred compositions. The diol constituent can likewise be varied, in the preferred embodiments, by adding small amounts of cycloaliphatic diols. In any event, the preferred polyesters are well known as film and fiber formers, and they are provided by methods outlined in Whinfield, U.S. Pat. No. 2,465,319 and Pengilly, U.S. Pat. No. 3,047,539, and elsewhere. The preferred polyesters will comprise a poly(alkylene terephthalate, isophthalate or mixed isophthalate-terephthalate, e.g, up to 30 mole percent isophthalate), said alkylene groups containing from 2 to 10 carbon atoms, e.g., poly(ethylene terephthalate) or poly(1,4-butylene terephthalate). Because of its rapid crystallization from the melt, it is preferred to use poly(1,4-butyleneterephthalate) as the normally flammable polyester resin component of the present compositions.

The molecular weight of the polyester component should be sufficiently high to provide an intrinsic viscosity of about 0.6 to 2.0 deciliters per gram, preferably 0.7 to 1.6 dl./g., measured for example, as a 1% solution in a 60:40 mixture of phenol and tetrachloroethane at 25° C.

In preferred embodiments, the polyester component (a) will be poly(1,4-butylene terephthalate) either straight chain or branched and it is present alone or in further combination with poly(ethylene terephthalate) or in the form of a block copolyester with an aromatic-aliphatic or aliphatic-aliphatic polyester or in the form of a blended composition with such a copolyester, or with a resin selected from an aromatic polycarbonate, a polyacrylate, a vinylaromatic compound-modified polyacrylate, a copolymer comprising a vinyl aromatic compound and a diene, or a mixture of any of the foregoing. Such combinations and methods of making them are known to those skilled in this art.

As has been mentioned, there will be used in the flame-retardant compositions of this invention a conventional flame-retardant synergist component (c), such an organic or inorganic antimony, aluminum or molybdenum compound, or mixture thereof. Such compounds are widely available or can be made in known ways. In preferred embodiments, the synergist will comprise an organic or inorganic antimony compound, and the type of antimony compound used is not critical, being a choice primarily based on economics. For example, as inorganic antimony compounds there can be used antimony oxide, $(Sb_2O_3)$; antimony phosphate; $KSb(OH)_6$; $NH_4SbF_6$; $SbS_3$; and the like. A wide variety of organic antimony compounds can also be used, such as antimony esters with organic acids; cyclic alkyl antimonities; aryl antimonic acids, and the like. Illustrative of the organic antimony compounds, including inorganic salts of such compounds are: KSb tartrate; Sb caproate; $Sb(OCH_2CH_3)_3$; $Sb(OCH(CH_3)CH_2CH_3)_3$; Sb polymethylene glycolate; triphenyl antimony; and the like. Especially preferred is antimony oxide.

The flame retardant component decabromodiphenyl ether (b) can be made in known ways and/or it is commercially available. Decabromodiphenyl ether is a white powder, having a melting range of 300°–315° C. and a theoretical bromine content of 83.3%, and a specific gravity of 3.04 g./cc. It is commercially available from Great Lakes Chemical Corporation, West Lafayette, Ind. 47906, U.S.A., under the trade designation DE-83R.

The amount of decabromodiphenyl ether used as flame retardant component (b) is not critical to the invention so long as it is present in a minor proportion based on said composition—major proportions are uneconomical and may detract from moldability, gloss and the like. However, at least an amount sufficient to render the thermoplastic polyester resin flame retardant, non-burning or self-extinguishing will be used, as the case may be. Those skilled in the art are well aware that the amount of component (b) will vary with the nature of the flammable resin(s) and the relative efficiency of the additive. In general, however, the amount of additive will be from 0.5 to 50 parts by weight per 100 parts by weight of the resinous components. A preferred range will comprise from about 3 to about 12 parts of component (b) per 100 parts of resinous components in the composition. The amount of synergist component (c) likewise can vary over a fairly wide range but, in general, there is used from about 0.5 to about 20 parts by weight per 100 parts of combined resinous components in the composition and preferably from about 1 to about 12 parts by weight of synergist (c).

Component (d) can vary widely in nature and type. In general, any of the olefin polymers described in Seydl et al., U.S. Pat. No. 3,957,757, incorporated herein by reference, can be used. Suitable olefin polymers are, for example, polyethylene, polypropylene, polymers of butene-1 and butene-2, poly-4-methylpentene-1 and copolymers of ethylene and propylene, ethylene and butenes and ethylene and 4-methylpentene-1. Also suitable are copolymers of ethylene and other unsaturated compounds such as vinyl esters derived from saturated carboxylic acids of from 2 to 6 carbon atoms, acrylates and methacrylates of alcohols of from 1 to 20 carbon atoms, acrylic acid, methacrylic acid, fumaric acid, maleic acid, and itaconic acid and esters of such carboxylic acids.

It is preferred to use polyethylene as component (d), and it can be linear or branched, and amounts of comonomers, e.g., vinyl acetate can be included. The polyethylene can be selected from low (0.910–0.925), medium (0.926–0.940) or high (0.941–0.965) density types. In any event, component (d) can be added in powder form, pellet form, emulsion form, or in the form of a concentrate, e.g., pellets comprising 20% by weight of polyolefin or olefin copolymer in polyester resin, and the like. The polyolefins can be obtained from a number of commercial sources. An especially suitable form of polyethylene is Microthene FN-510, a product of U.S.I. Chemical Co. Alternatively, Dow SI-4011769 PE pellets can be employed. The amount of polyolefin or olefin copolymer component (d) can likewise vary widely, e.g., from about 0.1 to about 25, but preferably from about 0.5 to about 10 parts per 100 parts by weight of the total of components (a)–(d), inclusive.

It is specifically contemplated by this invention to provide compositions which also include (e) an effective amount of a conventional filler and/or reinforcing agent. Among the fillers and/or reinforcing agents which may be used are glass, talc, mica, clay or a mixture of any of the foregoing. The amounts used are conventional and will, in general, range from about 1 to about 80 parts by weight per 100 parts by weight of the total composition. Especially preferably, the filler and/or reinforcing component (e) will comprise glass fibers. Preferably the glass will comprise from about 7.5 to about 40 parts by weight per 100 parts by weight of the total composition.

It is also regarded to be among the features of this invention to include in the compositions other ingredients such as mold release agents, pigments, stabilizers, nucleating agents, and the like, in conventional amounts for their conventionally employed purposes.

The manner of adding the flame retardant additives to the thermoplastic polyester resin is not critical; is conventional; and will be obvious to those skilled in the art. Preferably, however, each ingredient is added as part of a blend premix and the latter is mixed, e.g., by passage through an extruder, or by fluxing on a mill, at a temperature dependent on the needs of the particular composition. The mixed composition can be cooled and cut up into any desired shape. Typical processing and molding techniques will be illustrated hereinafter.

It is to be understood that the compositions of this invention can be used in many different ultimate shapes. They may be molded into three-dimensional articles, or formed into films, or extruded into rods, tubes, etc., or shaped into fibers, by conventional techniques.

DESCRIPTION OF THE PREFERRED EMBODIMENTS

The following examples illustrate the preparation of certain compositions within the scope of this invention. They are not to be construed to limit the scope of the invention in any manner whatsoever.

In general, each formulation evaluated is prepared in a Sterling 1¾" extruder and parts are molded in a 3 oz. Van Dorn injection molding machine at 150° F. mold temp.; 520° F. nozzle temp.; and 480° F. barrel temperature.

EXAMPLE 1

A flame-retardant composition comprising poly(1,4-butylene terephthalate), decabromodiphenyl ether, antimony oxide, stabilizers and polyolefin is prepared. For comparison purposes, one omitting the polyolefin is prepared. The formulations and bloom weight losses (in duplicate) are set forth in Table 1.

Weight loss due to bloom is determined on 2"×3"×⅛" plaques by thermally aging specimens at 100° C. and 170° C. for 24 hrs., 48 hrs. and 7 days. Surface coated (bloomed) decabromodiphenyl ether is removed with chloroform and total weight loss is determined. Each weight loss value is normalized and repeated as percent lost of total decabromodiphenyl ether content.

TABLE 1

Composition Comprising Polyester, Decabromodiphenylether, Antimony Oxide and Polyolefin

| Example | 1 | 1A* |
|---|---|---|
| Composition (parts by weight) | | |
| Poly(1,4-butylene terephthalate)$^a$ | 83.3 | 84.8 |
| Decabromodiphenyl ether$^b$ | 10.0 | 10.0 |
| Antimony oxide$^c$ | 5.0 | 5.0 |
| Polyolefin$^d$ | 1.5 | — |
| Stabilizer (to make 100) | | |
| Properties | | |
| % Decabromodiphenyl ether lost | | |
| at 100° C. 24 hrs. | 0.04 | 0.04 |
| | 0.04 | 0.05 |
| 48 hrs. | 0.06 | 0.07 |
| | 0.06 | 0.07 |
| 7 days | 0.08 | 0.12 |
| | 0.12 | 0.12 |
| at 170° C. 24 hrs. | 0.44 | 0.56 |
| | 0.45 | 0.58 |
| 48 hrs. | 0.63 | 0.85 |
| | 0.60 | 0.85 |
| 7 days | 1.06 | 1.42 |
| | 1.07 | 1.43 |

*Control
$^a$Valox 310, General Electric Company
$^b$DE-83R, Great Lakes Chemical Corporation
$^c$Chemetron Sb$_2$O$_3$
$^d$Polyethylene, Microthene FN-510, U.S.I. Chemicals The substantial improvement in bloom resistance can readily be seen.

EXAMPLES 3–8

The general procedure of Example 1 is repeated, but this time the polyolefin type is varied and glass fibers are added to produce reinforced flame retardant molded compositions and articles. The formulations used and the results obtained are set forth in Table 2.

TABLE 2

Glass Reinforced Compositions Comprising Polyester, Decabromodiphenyl Ether, Antimony Oxide and Polyolefin

| Example | 3 | 3A* | 4 | 4A* |
|---|---|---|---|---|
| Composition (parts by weight) | | | | |
| Poly(1,4-butylene terephthalate)$^a$ | 55.2 | 56.7 | 55.3 | 56.8 |
| Decabromodiphenyl ether$^b$ | 7.0 | 7.0 | 7.0 | 7.0 |
| Antimony Oxide$^c$ | 6.0 | 6.0 | 6.0 | 6.0 |
| Polyethylene powder$^{d(i)}$ | 1.5 | — | 1.5 | — |
| Polyethylene pellets$^{d(ii)}$ | — | — | — | — |
| Polyethylene pellets$^{d(iii)}$ | — | — | — | — |
| Polyethylene premix$^{d(iv)}$ | — | — | — | — |
| Glass fibers | 30.0 | 30.0 | 30.0 | 30.0 |
| Stabilizers (to make 100) | | | | |
| Properties | | | | |
| % Decabromodiphenyl ether lost | | | | |
| at 100° C. 24 hrs. | 0.02 | 0.04 | 0.02 | 0.05 |
| | 0.02 | 0.05 | 0.02 | 0.05 |
| 48 hrs. | 0.02 | 0.06 | 0.01 | 0.03 |
| | 0.02 | 0.05 | 0.01 | 0.04 |
| 7 days | 0.04 | 0.11 | 0.04 | 0.07 |
| | 0.04 | 0.11 | 0.04 | 0.10 |
| at 170° C. 24 hrs. | 0.33 | 0.52 | 0.40 | 0.47 |
| | 0.39 | 0.52 | 0.41 | 0.44 |
| 48 hrs. | 0.49 | 0.67 | 0.52 | 0.65 |
| | 0.53 | 0.69 | 0.56 | 0.64 |
| 7 days | 0.81 | 1.11 | 0.85 | 1.08 |
| | 0.82 | 1.12 | 0.87 | 1.02 |

| Example | 5 | 6 | 7 | 8 |
|---|---|---|---|---|
| Composition (parts by weight) | | | | |
| Poly(1,4-butylene terephthalate)$^a$ | 56.7 | 49.95 | 55.2 | 55.2 |
| Decabromodiphenyl ether$^b$ | 7.0 | 7.0 | 7.0 | 7.0 |
| Antimony oxide$^c$ | 6.0 | 5.25 | 6.0 | 6.0 |
| Polyethylene powder$^{d(i)}$ | 0.1 | — | — | — |
| Polyethylene pellets$^{d(ii)}$ | — | — | 1.5 | — |
| Polyethylene pellets$^{d(iii)}$ | — | — | — | 1.5 |
| Polyethylene premix$^{d(iv)}$ | — | 7.5 | — | — |
| Glass fibers | 30.0 | 30.0 | 30.0 | 30.0 |
| Stabilizer (to make 100) | | | | |
| Properties | | | | |
| % Decabromodiphenyl ether lost | | | | |
| at 100° C. 24 hrs. | 0.05 | 0.02 | 0.02 | 0.02 |
| | 0.05 | 0.02 | 0.02 | 0.02 |
| 48 hrs. | 0.06 | 0.01 | 0.02 | 0.02 |
| | 0.05 | 0.02 | 0.02 | 0.02 |
| 7 days | 0.10 | 0.04 | 0.04 | 0.04 |
| | 0.10 | 0.05 | 0.04 | 0.04 |
| at 170° C. 24 hrs. | 0.48 | 0.39 | 0.36 | 0.36 |
| | 0.48 | 0.38 | 0.37 | 0.36 |
| 48 hrs. | 0.63 | 0.54 | 0.54 | 0.49 |
| | 0.65 | 0.54 | 0.53 | 0.48 |
| 7 days | 1.06 | 0.82 | 0.85 | 0.73 |
| | 1.03 | 0.79 | 0.90 | 0.79 |

$^a$Valox 300, General Electric
$^{b,c,d(i)}$See Footnotes to Table 1
$^{d(ii)}$Dow pellets SI 4001178-polyethylene
$^{d(iii)}$Dow pellets SI 4011769-polyethylene
$^{d(iv)}$20% Microthene FN-510 in polybutylene terephthalate
*Control It is seen that the addition of powdered Microthene, at 1.5 parts by weight gives excellent reduction in bloom (3 or 4 vs. 3A and 4A). Microthane at 0.1 parts by weight gives only marginal bloom reduction (5). Formulations containing polyethylene pellets (7 and 8), and formulations employing a 20% microthene concentrate (6), give comparable reduction in bloom to polyethylene powder. These data would tend to indicate that polyolefin per se and not its physical state (pellets vs. powder) is the determining factor in reduction of bloom. It is possible that this phenomenon is the result of the polyolefin rich surface of the molded workpieces acting as a barrier to retard the loss of decabromodiphenyl ether. An interesting additional observation was that samples exposed to 170° C. for prolonged periods of time did not continue to bloom. After a loss of approximately 1.6%, the samples showed no more signs of blooming. This would indicate that blooming is a finite phenomenon and samples will not be depleted of flame retardant by aging for long periods of time if the teachings of the present invention are followed.

Many variations will suggest themselves to those skilled in this art in light of the above-detailed description. For example, all or part of the poly(1,4-butylene terephthalate) can be replaced with a modification branched with a small amount of pentaerythritol or copolyesterified with a poly(hexylene adipate-co-isophthalate). Part or most of the resin can be replaced with poly(ethylene terephthalate) or with poly(bisphenol-A carbonate). An impact improving additive such as poly(butyl acrylate), methyl methacrylate grafted butadiene-styrene, a block copolymer of styrene and butadiene, alone or in combination with polycarbonate can be used. Instead of polyethylene, polypropylene or an olefin copolymer, such as ethylene-vinyl acetate copolymer can be included in the composition. A segmented copolyester of the type sold by Dupont as Hydrel resins can be included. Instead of or in place of part of the glass, there can be included talc, mica, clay or mixtures thereof. All such obvious variations are within the full intended scope of the appended claims.

We claim:
1. In a flame retardant thermoplastic composition consisting essentially of:
   (a) a normally flammable high molecular weight polyester;
   (b) a flame retardant amount of decabromodiphenylether; and
   (c) an effective amount of an organic or in-organic flame retardant synergist compound,
the improvement which consists of including, as component (d), an effective amount of an olefin polymer, an olefin copolymer or a mixture thereof whereby a composition is obtained from which the decabromodiphenyl ether flame retardant shows a reduced tendency to bloom or plate out after molding and thermally aging the molded articles.

2. A composition as defined in claim 1 wherein component (d) comprises polyethylene.

3. A composition as defined in claim 1 wherein the amount of component (b) comprises from 3 to 12 parts, the amount of component (c) comprises from 1 to 12 parts and the amount of component (d) comprises from 0.5 to 10 parts per 100 parts by weight of said composition.

4. A composition as defined in claim 1 wherein said polyester component (a) comprises:

i. Poly (1, 4-butylene terephthalate), straight chain or branched;
ii. Poly (1, 4-butylene terephthalate), in combination with polyethylene terephthalate;
iii. A block copolyester of poly (1, 4-butylene terephthalate) with
   (a) An aromatic-aliphatic polyester; or
   (b) An aliphatic-aliphatic polyester;
iv. A blended composition of poly (1, 4-butylene terephthalate) and said block copolyester of (iii); and
v. Poly (1, 4-butylene terephthalate) blended with a resin selected from the group consisting of an aromatic polycarbonate, a polyacrylate, a vinyl aromatic compound-modified polyacrylate, a copolymer comprising a vinyl aromatic compound and a diene, and a mixture.

5. A composition as defined in claim 1 wherein component (c) comprises an organic or inorganic antimony, aluminum or molybdenum compound.

6. A composition as defined in claim 5 wherein component (c) is an organic or inorganic antimony containing compound.

7. A composition as defined in claim 1 wherein component (d) is added in the form of powder, pellets or a pre-extruded concentrate.

8. A composition as defined in claim 1 which also includes (e) an effective amount of a filler, a reinforcing agent, or a mixture.

9. A composition as defined in claim 8 wherein said filler, reinforcing agent, or mixture, comprises glass, talc, mica, clay, or a mixture.

10. A composition as defined in claim 9 wherein said filler, reinforcing agent, or mixture, comprises glass fibers.

11. A composition as defined in claim 10 wherein the glass fibers comprise from about 7.5 to about 40 parts by weight per 100 parts by weight of said composition.

12. In a flame retardant thermoplastic composition comprising
   (a) a normally flammable high molecular weight polyester;
   (b) a flame retardant amount of decabromodiphenyl ether; and
   (c) an effective amount of an organic or inorganic flame retardant synergist compound,
the improvement which consists of including, as component (d), an effective amount of an olefin polymer, an olefin copolymer or a mixture thereof, in the form of powder, pellets or a pre-extruded concentrate, whereby a composition is obtained from which the decabromodiphenyl ether flame retardant shows a reduced tendency to bloom or plate out after molding and thermally aging the molded articles.

* * * * *